(12) United States Patent
Bacallao

(10) Patent No.: US 10,117,530 B2
(45) Date of Patent: Nov. 6, 2018

(54) CALL BUTTON BRACKET

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/475,543

(22) Filed: Mar. 31, 2017

(65) Prior Publication Data

US 2017/0290447 A1 Oct. 12, 2017

Related U.S. Application Data

(63) Continuation-in-part of application No. 29/561,717, filed on Apr. 19, 2016.

(60) Provisional application No. 62/321,435, filed on Apr. 12, 2016, provisional application No. 62/347,119, filed on Jun. 8, 2016.

(51) Int. Cl.
| | |
|---|---|
| *A47F 9/04* | (2006.01) |
| *A47B 97/00* | (2006.01) |
| *G07G 1/00* | (2006.01) |
| *G06Q 20/18* | (2012.01) |
| *G06Q 20/20* | (2012.01) |

(52) U.S. Cl.
CPC .............. *A47F 9/04* (2013.01); *A47B 97/00* (2013.01); *G06Q 20/18* (2013.01); *G06Q 20/20* (2013.01); *G07G 1/0018* (2013.01); *G07G 1/0036* (2013.01); *A47B 2097/005* (2013.01); *A47F 2009/041* (2013.01)

(58) Field of Classification Search
CPC ... A47B 97/00; A47B 96/06; A47B 2097/005; A47F 9/04; A47F 2009/041; G07G 1/0018; H05K 7/12
See application file for complete search history.

(56) References Cited

U.S. PATENT DOCUMENTS

| | | | | |
|---|---|---|---|---|
| 5,115,888 A | * | 5/1992 | Schneider | A47F 9/048 186/61 |
| 6,315,134 B1 | * | 11/2001 | Stuart | A47B 55/02 108/109 |
| 2005/0188812 A1 | * | 9/2005 | Wang | A47B 21/0314 84/174 |

* cited by examiner

*Primary Examiner* — Mark J Beauchaine
(74) *Attorney, Agent, or Firm* — Schmeiser, Olsen & Watts LLP

(57) ABSTRACT

Disclosed is a call button system for a monitor at a self-checkout station of a retail store. The call button system includes an apparatus for coupling the call button to a monitor at the self-checkout station. The call button can be used by customers to summon help from a retail store employee while they are using the self-checkout station. The apparatus for coupling the call button to the monitor places the call button conveniently near the monitor the customer will be using at the self-checkout station. The apparatus for coupling the call button to the monitor includes a coupling bracket that couples the call button to the monitor. In some embodiments, the apparatus includes two S brackets that stabilize the call button and the coupling bracket.

12 Claims, 12 Drawing Sheets

United States Patent US 10,117,530 B2

CALL BUTTON BRACKET

CROSS REFERENCE TO RELATED APPLICATIONS

This invention claims priority to U.S. provisional patent application Ser. No. 62/321,435, filed Apr. 12, 2016 to Applicant Wal-Mart Stores Inc., and entitled "Call Button Bracket"; to U.S. provisional patent application Ser. No. 62/347,119, filed Jun. 8, 2016 to Applicant Wal-Mart Stores Inc., and entitled "Call Button Bracket"; and is a continuation-in-part of U.S. design patent application Ser. No. 29/561,717, filed Apr. 19, 2016 to Applicant Wal-Mart Stores Inc., and entitled "Call Button Bracket", the disclosures of which are incorporated entirely herein by reference.

BACKGROUND OF THE INVENTION

Technical Field

This invention relates to hardware used at checkout stations in retail stores, and in particular to a bracket for coupling a call button to a monitor at a self-checkout station.

State of the Art

Self-checkout (SCO) stations are popular in retail stores. A self-checkout station is a checkout station in a retail store where a customer rings up, pays for, and possibly bags their purchased items themselves, without the help of a cashier. However, there are often situations where a customer using a SCO station needs help from a cashier or store employee. It is advantageous to have a call button positioned at the SCO station that a customer can use to call for help. It is also advantageous to have this call button be securely mounted and be near the monitor the customer is using to monitor the checkout process. It is also advantageous if the call button is held in such a way that the force of activating the call button does not cause the call button to move or break the call button mounting structure.

Accordingly, what is needed is an apparatus for coupling a call button to the monitor of the SCO station that securely holds the call button to the monitor, and that does not break after repeated uses of the call button.

DETAILED DESCRIPTION OF EMBODIMENTS OF THE INVENTION

Figure 1:
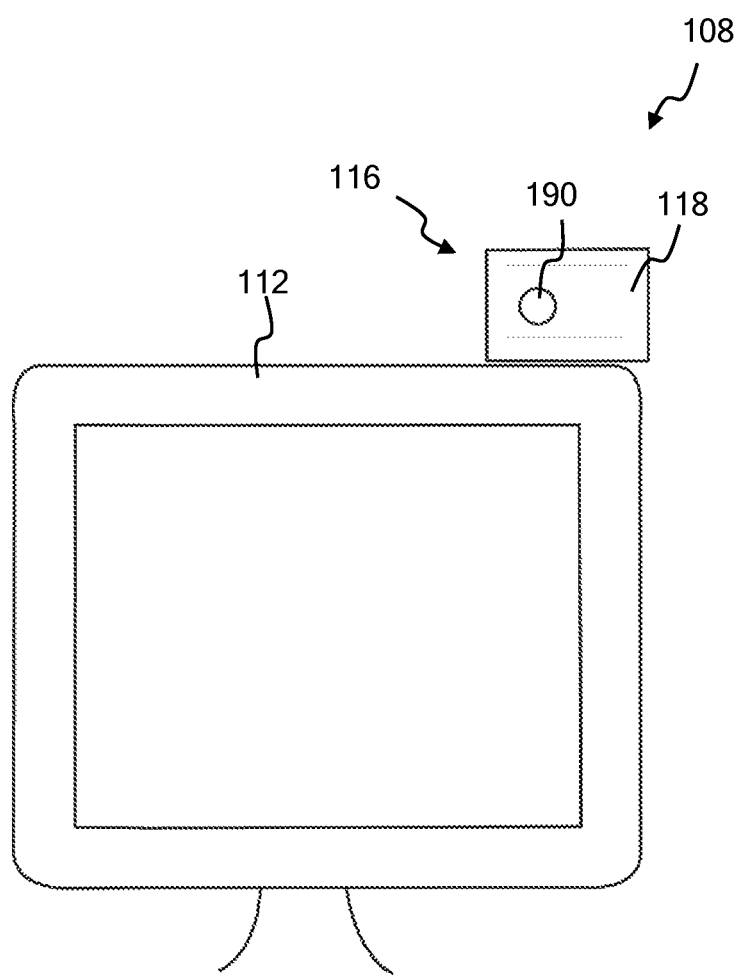
FIG. 1 shows a front view of a call button system for a monitor of a self-checkout station in a retail store.

As discussed above, embodiments of the present invention relate to hardware used at checkout stations in retail stores, and in particular to a bracket for coupling a call button to a monitor at a self-checkout (SCO) station.

Disclosed is a call button system for a monitor at a self-checkout station of a retail store. The call button system includes a call button and an apparatus for coupling the call button to the monitor at the self-checkout station. The call button can be used by a customer at the self-checkout station to summon help from a retail store employee. Activating the call button summons help for the customer at the checkout station. The apparatus for coupling the call button to the monitor places the call button conveniently near the monitor the customer is using at the self-checkout station. The apparatus for coupling the call button to the monitor includes a coupling bracket that couples the call button to the monitor. In some embodiments, the coupling bracket is triangular shaped. In some embodiments, the apparatus includes two S brackets that stabilize the call button and the coupling bracket, as well as transfers some of the force of pressing the call button to a front surface of the monitor, so that the repeated force of pressing the call button by a customer does not stress or break the coupling bracket.

Self-checkout (SCO) stations are seeing increased use in retail stores. Self-checkout stations are checkout stations where a customer rings up, pays for, and possibly bags their purchased items themselves, without the help of a cashier. However, there are often situations where a customer using a SCO station needs help from a cashier or store employee. The customer may have made a mistake, for example, or they do not understand how to ring up a particular item. Or, the customer may be purchasing restricted items, such as alcohol or tobacco, where a cashier is needed to ensure that the customer is authorized to purchase the items. It is advantageous to have a call button positioned at the SCO station that a customer can use to call for help. It is also advantageous to have this call button be securely mounted and be near the monitor the customer is using to monitor the checkout process. It is also advantageous if the call button is held in such a way that the force of activating the call button does not cause the call button to move or break the mounting structure. The disclosed apparatus for coupling a call button to a monitor holds the call button near the monitor so it is convenient and easy for a customer to find and activate the call button. The disclosed coupling bracket can couple the call button to any corner of a monitor, to accommodate different SCO station configurations. The coupling bracket can be made out of any rigid material, such as plastic, or metal, for example. The coupling bracket can be made out of recyclable material. A triangular shape of the coupling bracket provides a lightweight coupling bracket that is strong and resistant to forces or loads. The disclosed S brackets, which are part of the apparatus in some embodiments, help to stabilize the call button so it does not move when the call button is pushed. In some embodiments, the S brackets transfer some of the force of pushing the call button onto a front surface of the monitor. This reduces the forces on and breakage of the coupling apparatus and the screws and screw holes used to couple the coupling bracket to the call button.

The disclosed apparatus for coupling a call button to a monitor at a self-checkout station includes a means to couple the call button to the monitor. In some embodiments, the apparatus also includes a means to stabilize the call button. In some embodiments, the apparatus includes a first and a second means to stabilize the call button. The means to stabilize the call button includes a means to transfer a first force on the call button to a second force on a front surface of the monitor.

Figure 2:
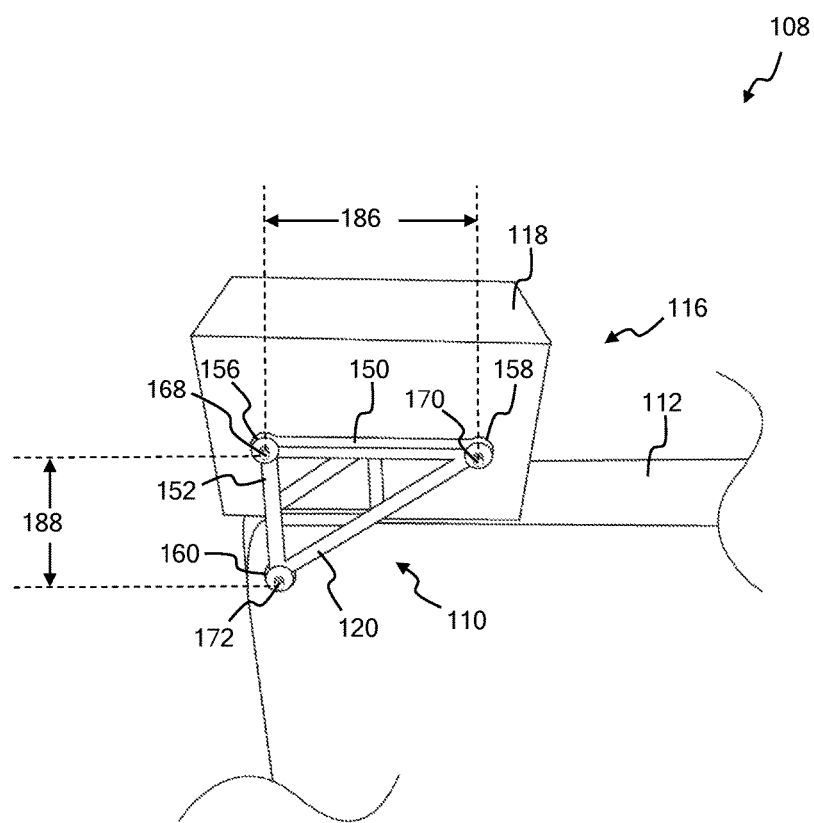
FIG. 2 shows a rear view of the call button system of FIG. 1, showing an apparatus for coupling the call button to the monitor.
Figure 3:
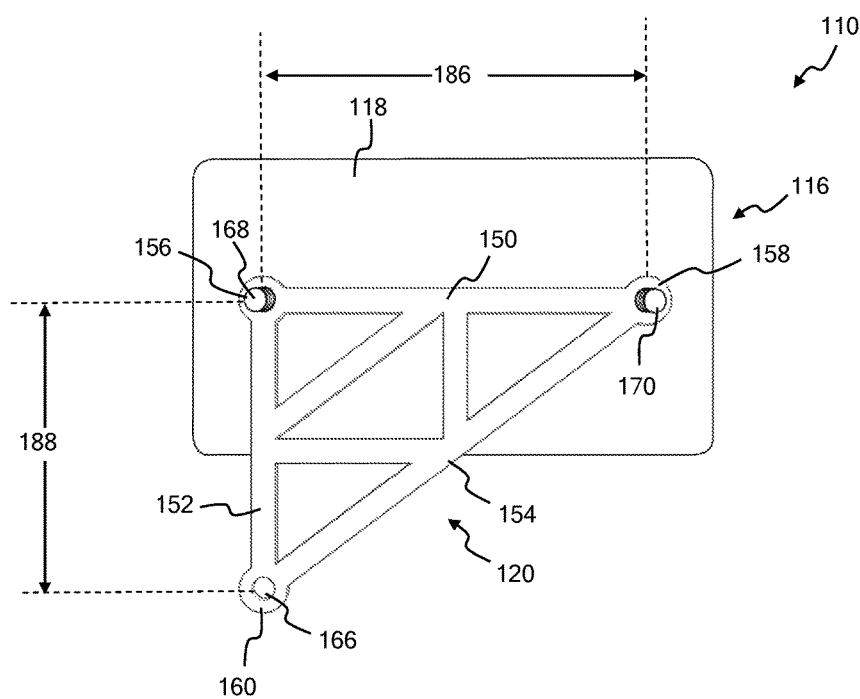
FIG. 3 shows another view of the apparatus for coupling the call button to the monitor of FIG. 2.
Figure 4:
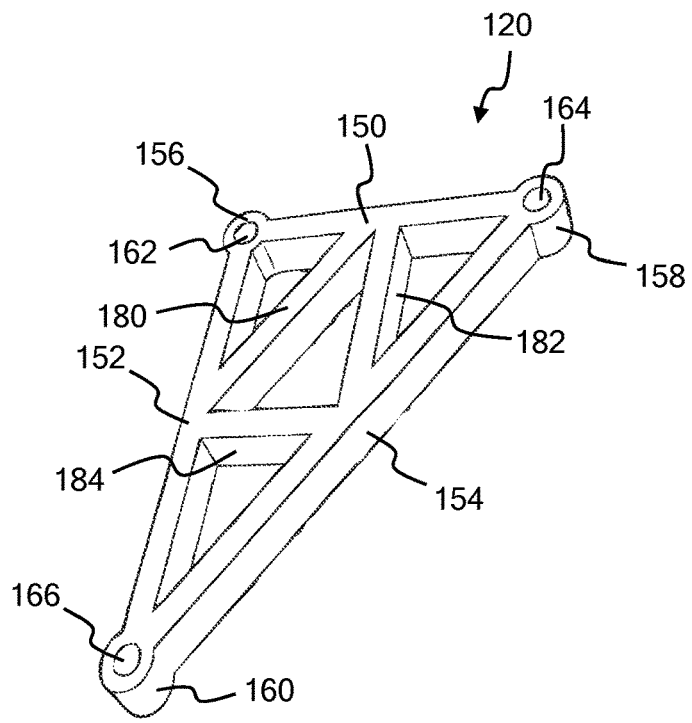
FIG. 4 shows a perspective view of a coupling bracket of the apparatus for coupling the call button to the monitor of FIG. 2.
Figure 5:
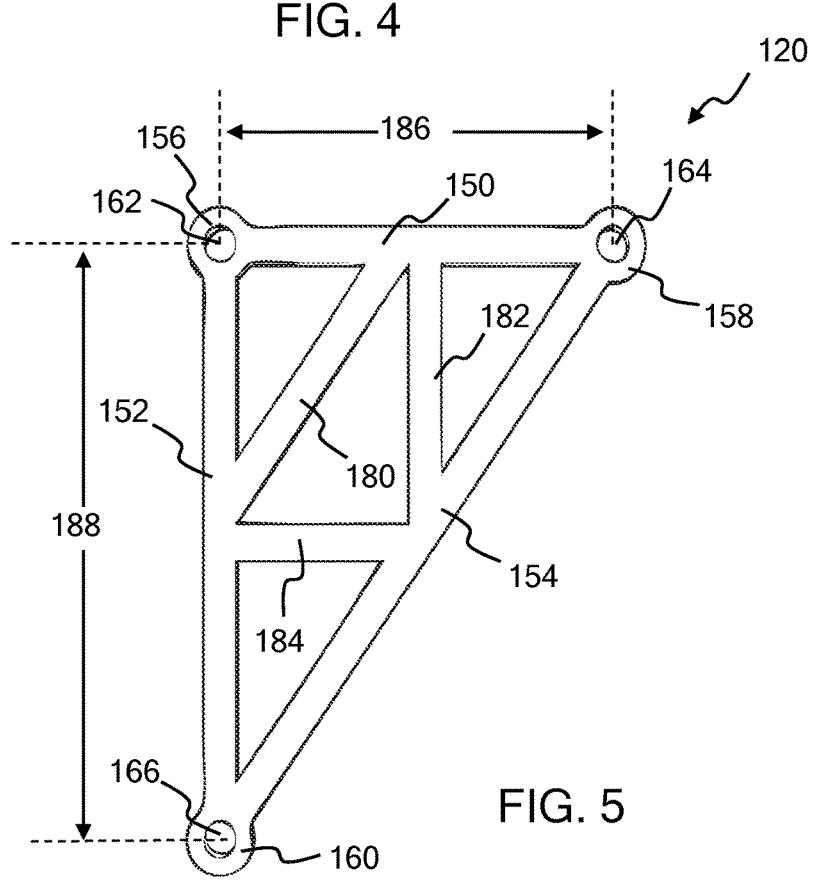
FIG. 5 shows a front view of the coupling bracket of FIG. 4.

FIG. 1 shows a front perspective view of a call button system 108 for a monitor 112 at a self-checkout station in a retail store. FIG. 2 shows a rear perspective view of system 108. Call button system 108 includes an apparatus 110 for coupling a call button 116 to a monitor 112 at a self-checkout station of a retail store (see FIG. 2). In this embodiment, apparatus 110 is the means to couple call button 116 to monitor 112. Apparatus 110 in this embodiment includes a coupling bracket 120 as shown in FIG. 2, FIG. 3, FIG. 4, and FIG. 5. FIG. 3 shows coupling bracket 120 coupled to a housing 118 of call button 116. FIG. 4 shows a front perspective view of coupling bracket 120. FIG. 5 shows a front view of coupling bracket 120. In some embodiments, apparatus 110 includes other parts and pieces, see, for example, apparatus 210 discussed herein in association with FIG. 6 through FIG. 13.

Referring back to FIG. 1, call button 116 includes call button housing 118 and a pushbutton switch 190 that activates a call for assistance. Call button housing 118 holds pushbutton switch 190 and encloses the electronics associated with pushbutton switch 190. When a customer pushes pushbutton switch 190, a retail store employee is summoned, and comes to the aid of the customer.

Coupling bracket 120 couples call button housing 118 to monitor 112, as shown in FIG. 1 and FIG. 2. In this embodiment, coupling bracket 120 is triangular shaped, but this is not meant to be limiting. The triangular shape of coupling bracket 120 keeps the size, weight, and cost of coupling bracket 120 to a minimum, while still providing a sturdy coupling bracket 120. In this embodiment, coupling bracket 120 is in the shape of a right triangle, but this is not meant to be limiting. FIG. 4 and FIG. 5 show a perspective view and a front view, respectively, of triangular coupling bracket 120. In this embodiment, triangular coupling bracket 120 includes three side rods, a first side rod 150, a second side rod 152, and a third side rod 154. Side rods 150, 152, and 154 are coupled together at three vertices, a first vertex 156, a second vertex 158, and a third vertex 160.

Triangular coupling bracket 120, in the embodiment shown in the figures, also includes three support rods, a first support rod 180, a second support rod 182, and a third support rod 184, as shown in FIG. 4 and FIG. 5. Support rods 180, 182, and 184 each extend between two of side rods 150, 152, and 154, and provide structural support for triangular coupling bracket 120 so that triangular coupling bracket 120 does not bend, flex or break from use. In the embodiment shown in FIG. 1 through FIG. 4, first support rod 180 extends between first side rod 150 and second side rod 152. Second support rod 182 extends between first side rod 150 and third side rod 154. Third support rod 184 extends between second side rod 152 and third side rod 154. In some embodiments, support rods 180, 182, and 184 are not used.

In some embodiments, fewer or more than three support rods are used. In this embodiment, side rods 150, 152, and 154, and support rods 180, 182, and 184 each have a rectangular cross-section, but this is not meant to be limiting. Side rods 150, 152 and 154 are elongate members in this embodiment. An elongate member is an object with a length much longer than its width, such as a bar or a rod. In this embodiment, side rods 150, 152, and 154 are elongate rods with a rectangular cross section. Support rods 180, 182 and 184 are elongate members in this embodiment. In this embodiment, support rods 180, 182, and 184 are elongate rods with a rectangular cross section.

Coupling bracket 120 also include three holes 162, 164, and 166, where each hole 162, 164, and 166 extends through one of vertices 156, 158, and 160. In this embodiment, first hole 162 extends through first vertex 156, second hole 164 extends through second vertex 158, and third hole 166 extends through third vertex 160. Holes 162, 164, and 166 are used to extend screws through coupling bracket 120 to mount coupling bracket 120 to call button housing 118 and monitor 112.

First side rod 150 in this embodiment has a first side rod length 186, see FIG. 2, FIG. 3, and FIG. 5. First side rod 150 extends between first vertex 156 and second vertex 158. First side rod length 186 is chosen such that first hole 162 in first vertex 156 and second hole 164 in second vertex 158 line up with screw holes in call button housing 118. FIG. 3 shows a rear view of call button housing 118, with coupling bracket 120 coupled to call button housing 118. The first and second screw holes in the call button housing are not visible in the figure. The first screw hole is below first vertex 156 and has a first screw 168 screwed into it to couple coupling bracket 120 to call button housing 118. The second screw hole is below second vertex 158 and has a second screw 170 screwed into it to couple coupling bracket 120 to call button housing 118. First screw 168 extends through first hole 162 into the first screw hole in call button housing 118, and second screw 170 extends through second hole 164 and into the second screw hole in call button housing 118. Triangular coupling bracket 120 is coupled to call button housing 118 in response to extending first screw 168 through first hole 162 and into the first screw hole in call button housing 118, and extending second screw 170 through second hole 164 and into the second hole in call button housing 118.

Second side rod 152 has a second side rod length 188, as shown in FIG. 2, FIG. 3 and FIG. 5. Second side rod 152 extends between first vertex 156 with first hole 162, and third vertex 160 with third hole 166. Coupling bracket 120 couples call button housing 118 to monitor 112 in response to using first and second screws 168 and 170 to attach coupling bracket 120 to call button housing 118, and then using a third screw 172 (FIG. 2) through third hole 166 and into a monitor screw hole in monitor 112. Monitor 112 often has a number of different monitor screw holes, so that call button 116 can be coupled to monitor 112 at any of various locations such as at the corners of monitor 112, or other positions or locations on monitor 112.

Third side rod 154 extends between second vertex 158 and third vertex 160. First and second vertex 156 and 158 are coupled to call button housing 118 of call button 116 in this embodiment, but this is not meant to be limiting. Third vertex 160 is coupled to monitor 112 in this embodiment, but this is not meant to be limiting.

Once coupling bracket 120 couples call button 116 to monitor 112, call button 116 is positioned near monitor 112 so that it is convenient for a customer to activate call button 116 by pushing pushbutton switch 190 to receive help.

Figure 6:
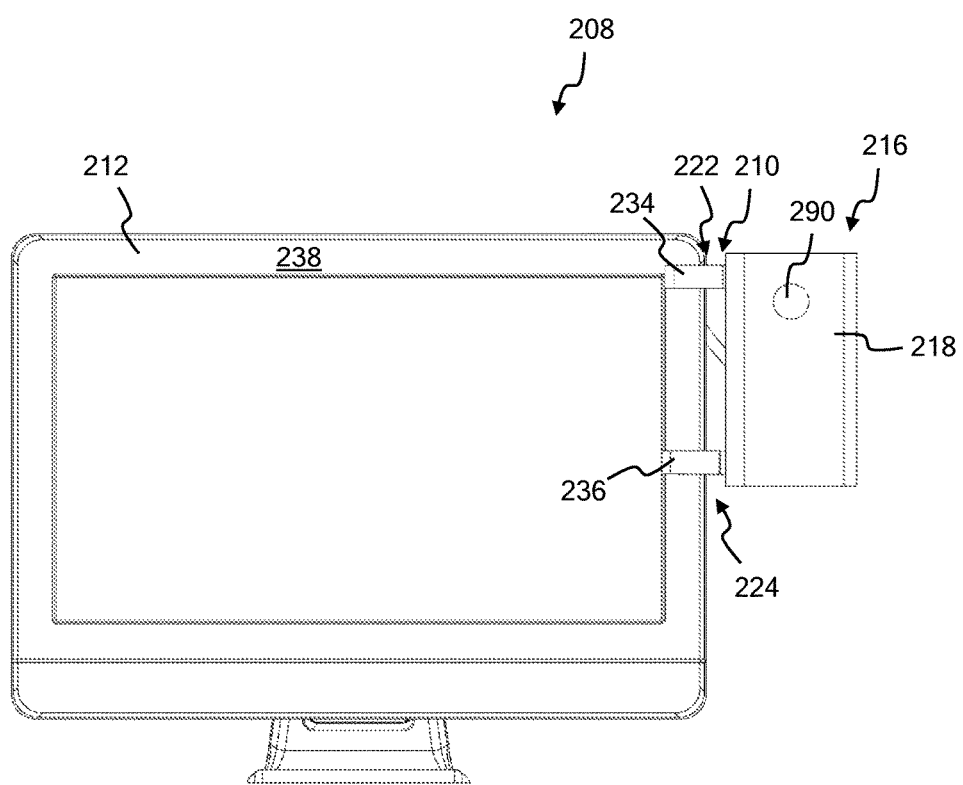
FIG. 6 shows a front view of a further embodiment of a call button system for a monitor at a self-checkout station.

FIG. 6 through FIG. 13 show details of an embodiment of a call button system 208 for a self-checkout station in a retail store, including an apparatus 210 for coupling the call button to monitor 212. Call button system 208 includes a monitor 212, a call button 216 and apparatus 210 for coupling call button 216 to monitor 212. In this embodiment, apparatus 210 includes coupling bracket 220 and a first and a second S bracket 222 and 224. FIG. 6 shows a front view of call button system 208 including call button 216 and apparatus 210 for coupling call button 216 to monitor 212. Apparatus 210 is similar to apparatus 110, except that apparatus 210 also includes a means to stabilize call button 216. Specifically, apparatus 210 includes coupling bracket 220 and first and second S bracket 222 and 224, which are a first and a second means to stabilize call button 216. First and second S bracket 224 and 224 are a means to transfer a first force on call button 216 to a second force on a front surface 238 of monitor 212. This stabilizes call button 216 when a pushbutton switch 290 of call button 216 is pushed by a customer, and transfers some of the force created by the customer pushing pushbutton switch 290 to a front surface 238 of monitor 212 so that apparatus 210 does not break from repeated pushes of pushbutton switch 290.

Figure 7:
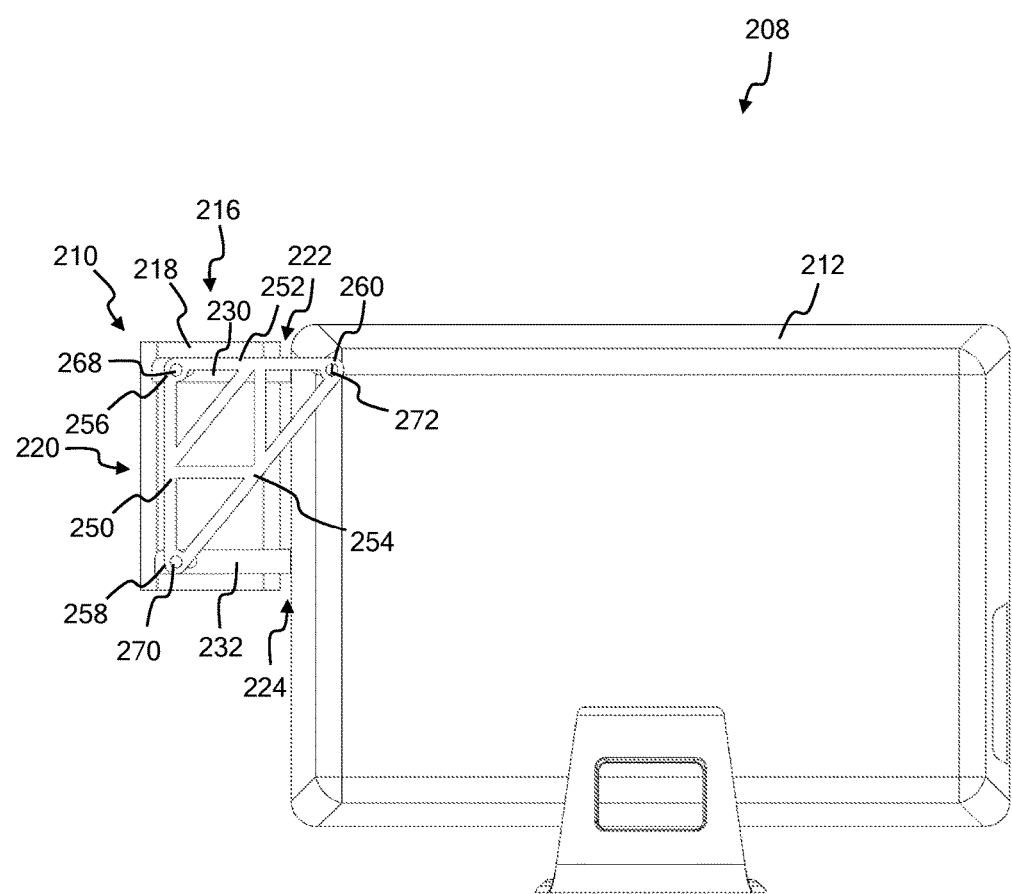
FIG. 7 shows a rear view of the call button system for a monitor at a self-checkout station of FIG. 6.
Figure 8:
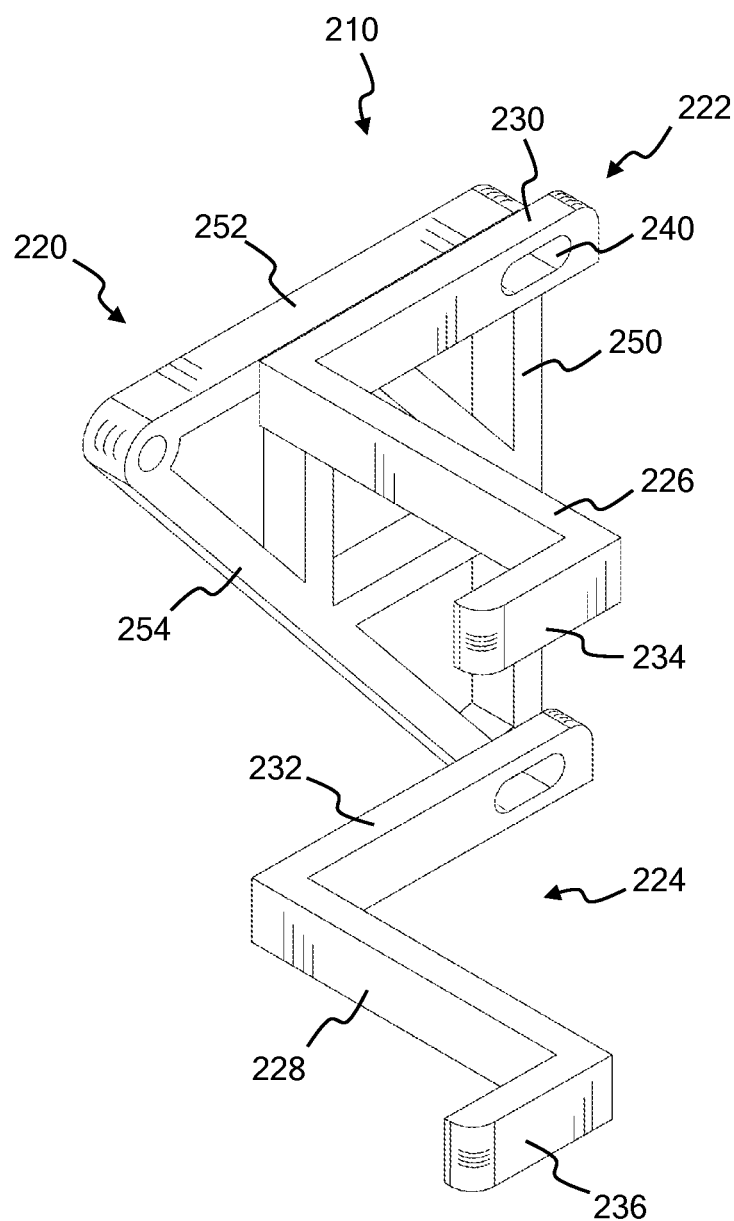
FIG. 8 shows a front perspective view of an apparatus for coupling a call button to a monitor at a self-checkout station.
Figure 9:
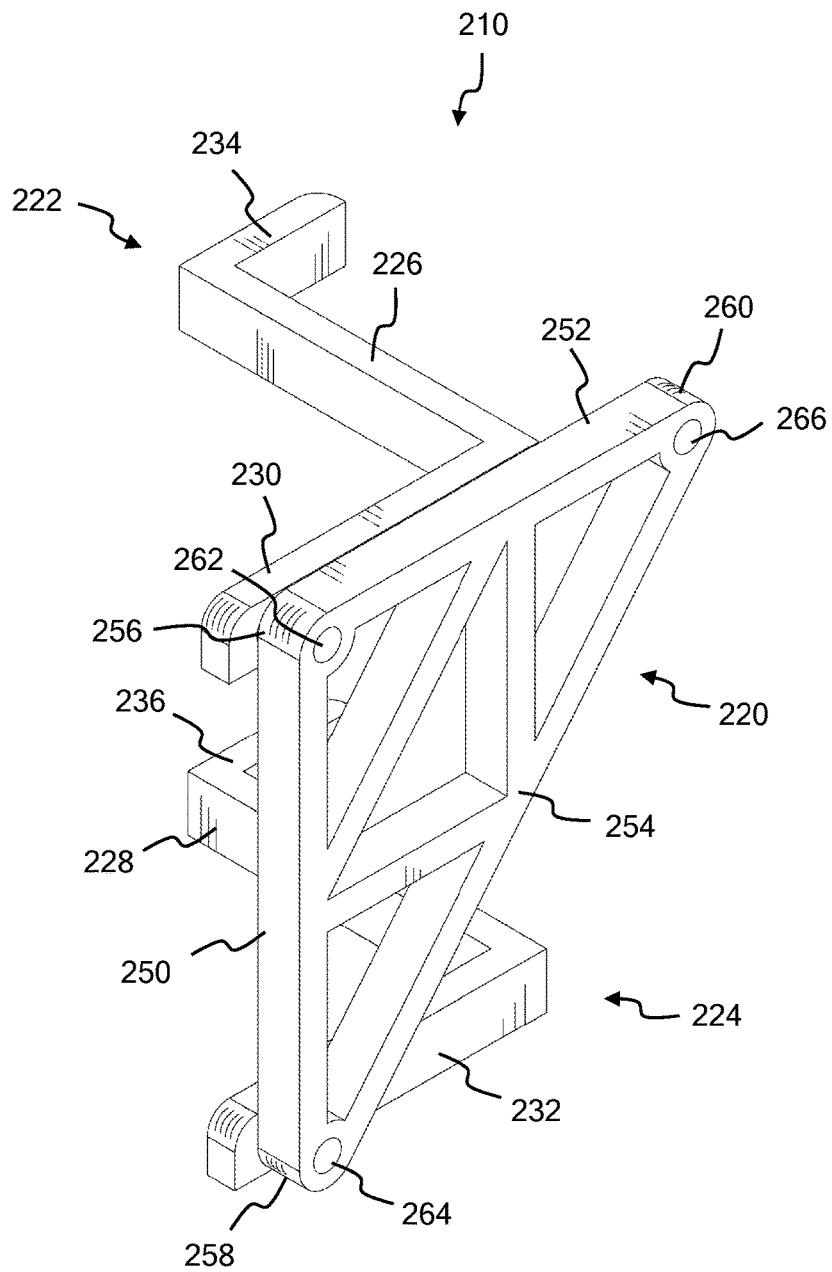
FIG. 9 shows a rear perspective view of the apparatus for coupling a call button to a monitor of FIG. 8.
Figure 10:
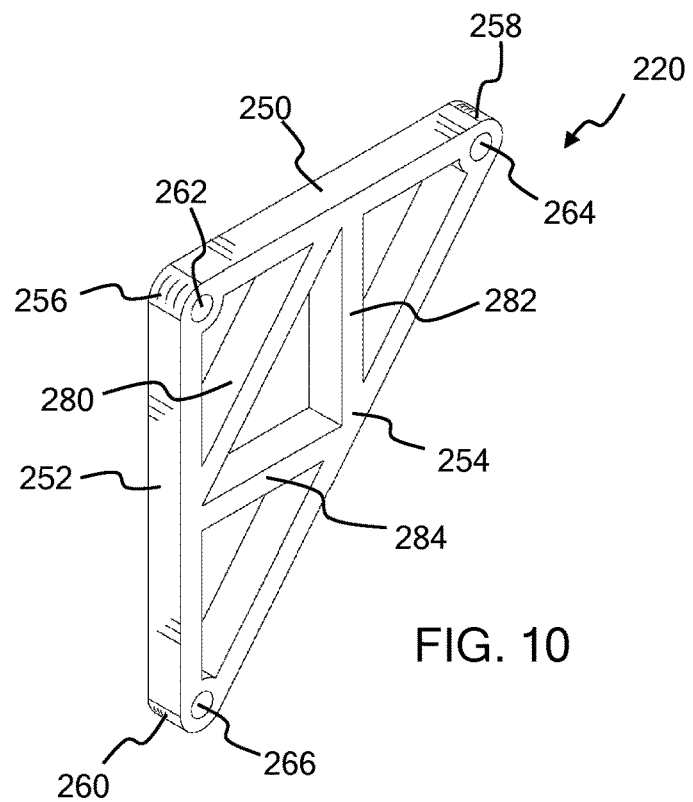
FIG. 10 shows a perspective view of a coupling bracket.
Figure 11:
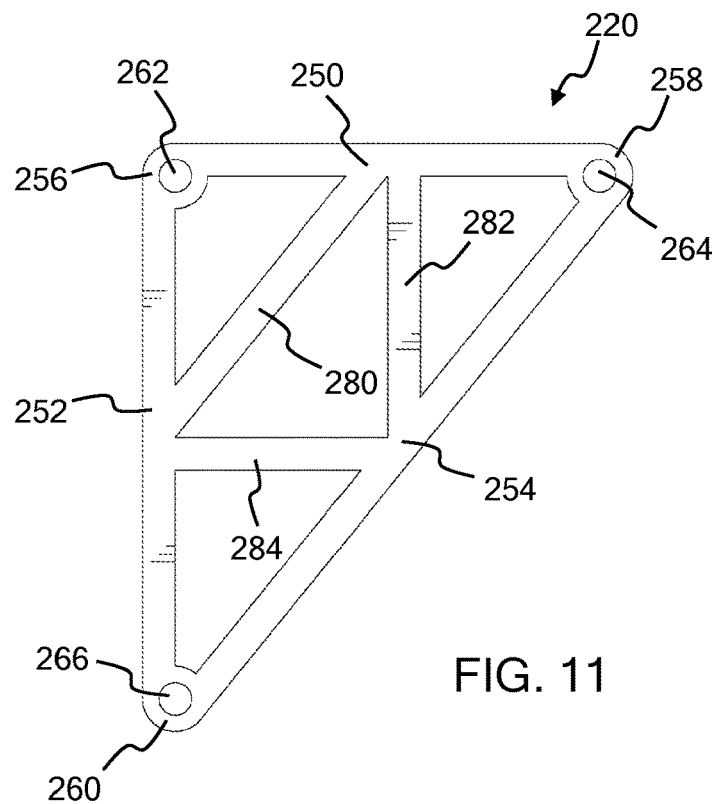
FIG. 11 shows a front view of the coupling bracket of FIG. 10.
Figure 12:
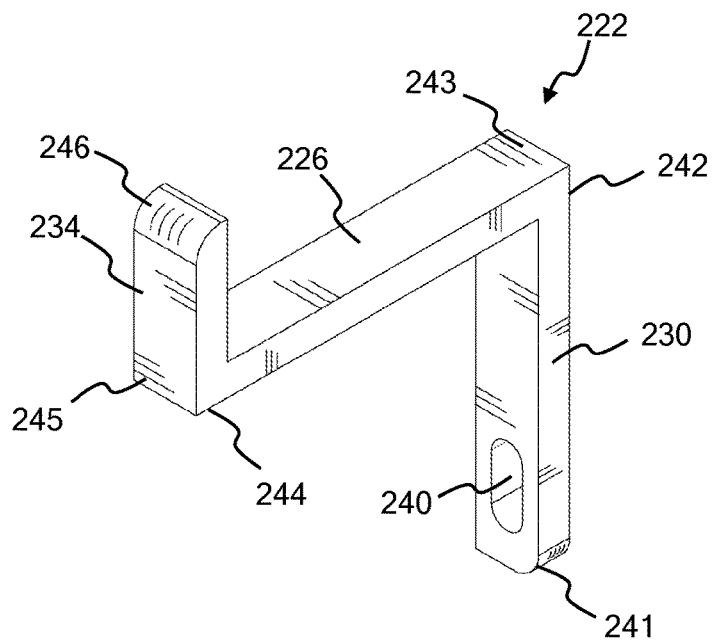
FIG. 12 shows a perspective view of an S bracket.
Figure 13:
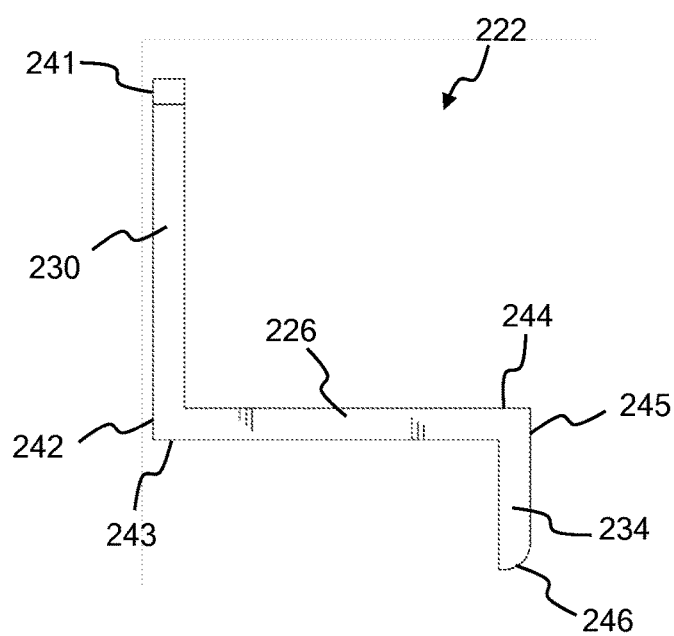
FIG. 13 shows a side view of the S bracket of FIG. 12.

FIG. 7 shows a rear perspective view of system 208 and apparatus 210. FIG. 8 shows a front perspective view of apparatus 210. FIG. 9 shows a rear perspective view of apparatus 210. FIG. 10 shows a perspective view of a coupling bracket 220 of apparatus 210. FIG. 11 shows a front view of coupling bracket 220. FIG. 12 shows a perspective view of an S bracket 222. FIG. 13 shows a side view of S bracket 222.

Call button system 208 includes call button 216, coupling bracket 220, first S bracket 222, and second S bracket 224. Call button 216 includes a call button housing 218 and pushbutton switch 290 that activates a call for assistance. Call button housing 218 holds pushbutton switch 290 and encloses the electronics associated with pushbutton switch 290. When a customer pushes pushbutton switch 290, a store employee is summoned, and comes to the aid of the customer.

Apparatus 210 includes coupling bracket 220 and first and second S bracket 222 and 224, as can best be seen in FIG. 8 and FIG. 9. First and second S bracket 222 and 224 are positioned between call button housing 218 and coupling bracket 220.

Coupling bracket 220 couples call button housing 218 to monitor 212, as shown in FIG. 6 and FIG. 7. In this embodiment, coupling bracket 220 is triangular shaped, but this is not meant to be limiting. FIG. 10 and FIG. 11 show a perspective view and a front view, respectively of triangular coupling bracket 220. In this embodiment, triangular coupling bracket 220 includes three side rods, a first side rod 250, a second side rod 252, and a third side rod 254. Side rods 250, 252, and 254 are coupled together at three vertices, a first vertex 256, a second vertex 258, and a third vertex 260. In this embodiment, triangular coupling bracket 220 also include three support rods, a first support rod 280, a second support rod 282, and a third support rod 284. Support rods 280, 282, and 284 each extend between two of side rods 250, 252, and 254, and provide structural support for triangular coupling bracket 220 so that triangular coupling bracket 220 does not bend, flex or break from use. In some embodiments, support rods 280, 282, and 284 are not used. In some embodiments, fewer or more than three support rods are used. Side rods 250, 252, and 254, and support rods 280, 282, and 284 are all elongate members with rectangular cross-sections in this embodiment, but this is not meant to be limiting.

Coupling bracket 220 also includes three holes 262, 264, and 266, where each hole 262, 264, and 266 extends through one of vertices 256, 258, and 260. In this embodiment, first hole 262 extends through first vertex 256, second hole 264 extends through second vertex 258, and third hole 266 extends through third vertex 260. Holes 262, 264, and 266 are used to extend screws through to mount coupling bracket 220 to call button housing 218 and monitor 212, as explained earlier for mounting coupling bracket 120 to monitor 112.

Coupling bracket 220 couples call button housing 218 to monitor 212 in response to using a first and a second screw through first and second holes 262 and 264 to attach coupling bracket 220 to call button housing 218, and using a third screw to extend through third hole 266 and into a hole in monitor 212. Monitor 212 has a number of different holes that can be used to couple call button 216 to monitor 212. In this embodiment, screws 268, 270, and 272 are used to couple coupling bracket 220 to call button housing 218 and monitor 212, as shown in FIG. 7. Using a triangle shape for coupling bracket 220 minimizes the size and weight of coupling bracket 220, while still providing a sturdy connection between call button housing 218 and monitor 212.

Once apparatus 210 couples call button 216 to monitor 212, call button 216 is positioned near monitor 212 so that it is convenient for a customer to activate call button 216 by pushing pushbutton switch 290 to receive help.

Apparatus 210 also includes first and second S brackets 222 and 224, as shown in FIG. 6 through FIG. 9. First and second S brackets 222 and 224 stabilize call button housing 218 when a customer pushes pushbutton switch 290. In some embodiments, only one of S brackets 222 or 224 is included in apparatus 210.

FIG. 12 shows a perspective view of first S bracket 222. FIG. 13 shows a side view of first S bracket 222. Second S bracket 224 is the same as first S bracket 222 and can be seen best in FIG. 8 and FIG. 9.

Referring to FIG. 12 and FIG. 13, first S bracket 222 includes a first S bracket center section 226, a first S bracket base leg 230, and a first S bracket stabilizing leg 234. First S bracket base leg 230 is an elongate member with a base leg first end 241 and a base leg second end 242 opposing base leg first end 241. First S bracket center section 226 is an elongate member with a center section first end 243 and a center section second end 244 opposing center section first end 243. Center section first end 243 is coupled to base leg second end 242. In this embodiment, first S bracket center section 226 is coupled to first S bracket base leg 230 such that first S bracket center section 226 is perpendicular to first S bracket base leg 230, but this is not meant to be limiting.

First S bracket stabilizing leg 234 is an elongate member with a stabilizing leg first end 245 and a stabilizing leg second end 246 opposing stabilizing leg first end 245. Stabilizing leg first end 245 is coupled to center section second end 244. In this embodiment, first S bracket stabilizing leg 234 is coupled to first S bracket center section 226 such that first S bracket center section 226 is perpendicular to first S bracket stabilizing leg 234, but this is not meant to be limiting.

Second S bracket 222 similarly includes a second S bracket center section 228, a second S bracket base leg 232, and a second S bracket stabilizing leg 236.

Center sections 226 and 228 extend between call button housing 218 and monitor 212 when apparatus 210 is used to couple call button 216 to monitor 212, as shown in FIG. 6 and FIG. 7. Center sections 226 and 228 help to stabilize the position of call button housing 218 against monitor 212. Center sections 226 and 228 also help to minimize relative movement between call button housing 218 and monitor 212.

Base legs 230 and 232 are used to secure S brackets 222 and 224 to coupling bracket 220 and call button housing 218, as shown in FIG. 7, FIG. 8, and FIG. 9. Base legs 230 and 232 are mounted between coupling bracket 220 and call button housing 218, as can best be seen in FIG. 7. Base legs 230 and 232 are captured between coupling bracket 220 and call button housing 218 using the same screws that attach coupling bracket 220 to call button housing 218. First base leg 230 is coupled to second side rod 252 in this embodiment. First base leg 230 is mounted between coupling bracket second side rod 252 and call button housing 218. First screw 268 extends through first hole 262, through a hole 240 in base leg first end 241 of base leg 230 (FIG. 8, FIG. 9, FIG. 12 and FIG. 13), and into a screw hole in call button housing 218 to couple first S bracket 222 to call button housing 218, as shown in FIG. 7. Second screw 270 extends through second hole 264, through a hole in second base leg 232, and into call button housing 218 to couple second S bracket 224 to call button housing 218, as can be seen in FIG. 7. Third screw 272 extends through third hole 266 in third vertex 260 of coupling bracket 220 and into monitor 212 to couple call button 216 and coupling apparatus 210 to monitor 212.

First and second stabilizing legs 234 and 236 extend along a front surface 238 of monitor 212, as can best be seen in FIG. 6. When a first force is put on pushbutton switch 290, such as when a customer pushes pushbutton 290 to activate call button 216, first and second S brackets 222 and 224 transfer a portion of this first force to front surface 238 of monitor 212. The first force is transferred through call button housing 218 to base legs 230 and 234, through center sections 226 and 228 to stabilizing legs 234 and 236, which exert a second force on front surface 238 in response to the first force on pushbutton switch 290. First and second stabilizing legs 234 and 236 minimize the flexure of coupling bracket 220 and increases the life of coupling bracket 220 by reducing the amount of force that coupling bracket 220, as well as the screw holes and screws holding coupling bracket 220 to call button housing 218, must withstand.

Embodiments of a call button system for a monitor at a self-checkout station of a retail store have been shown and described. The call button system includes an apparatus for coupling the call button to a monitor at the self-checkout station. The call button can be used by customers to summon help from a retail store employee while they are using the self-checkout station. The apparatus for coupling the call button to the monitor places the call button conveniently near the monitor the customer will be using at the self-checkout station. The apparatus for coupling the call button to the monitor includes a coupling bracket that couples the call button to the monitor. In some embodiments, the coupling bracket is triangular shaped. In some embodiments, the apparatus includes two S brackets that stabilize the call button and the coupling bracket, and transfers some of the force of pressing the call button to a front surface of the monitor, so that the repeated force of pressing the call button by a customer does not stress or break the coupling bracket.

Figure 14:
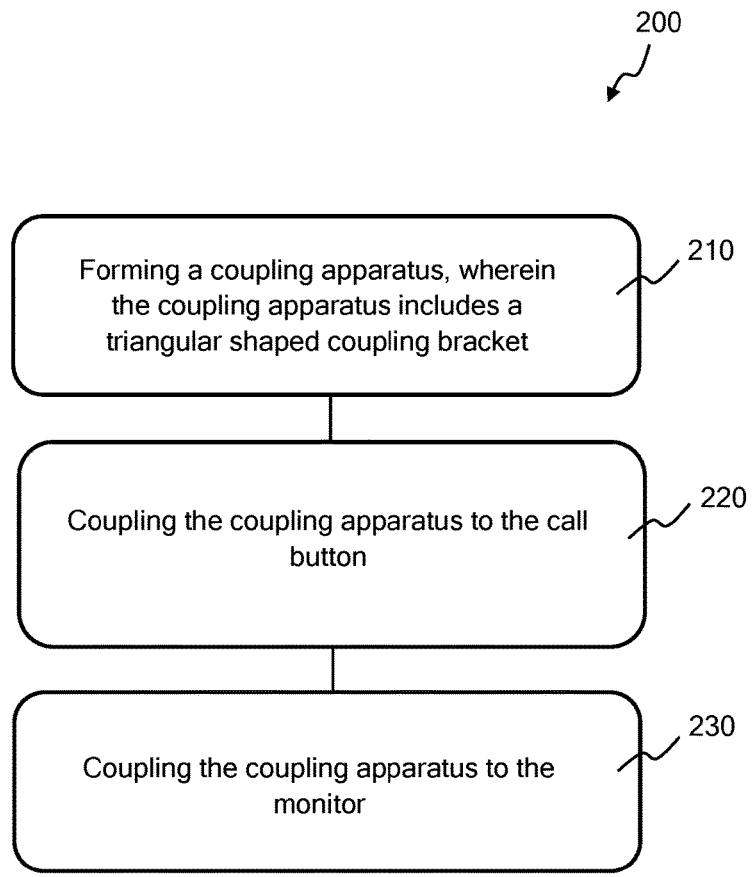
FIG. 14 illustrates a method of mounting a call button to a monitor.

FIG. 14 illustrates a method 200 of mounting a call button to a monitor. Method 200 includes an act 210 of forming a coupling apparatus, where the coupling apparatus includes a triangular shaped coupling bracket. Method 200 includes an act 220 of mounting the coupling apparatus to the call button. Method 200 also includes an act 230 of mounting the coupling apparatus to the monitor. Method 200 can include many other steps.

In some embodiments, forming the coupling apparatus includes forming a triangular shaped coupling bracket. In some embodiments, forming the coupling apparatus includes forming a first and a second S bracket. In some embodiments, forming the coupling apparatus includes coupling the first S bracket to the coupling bracket. In some embodiments, forming the coupling apparatus includes coupling the second S bracket to the coupling bracket.

Figure 15:
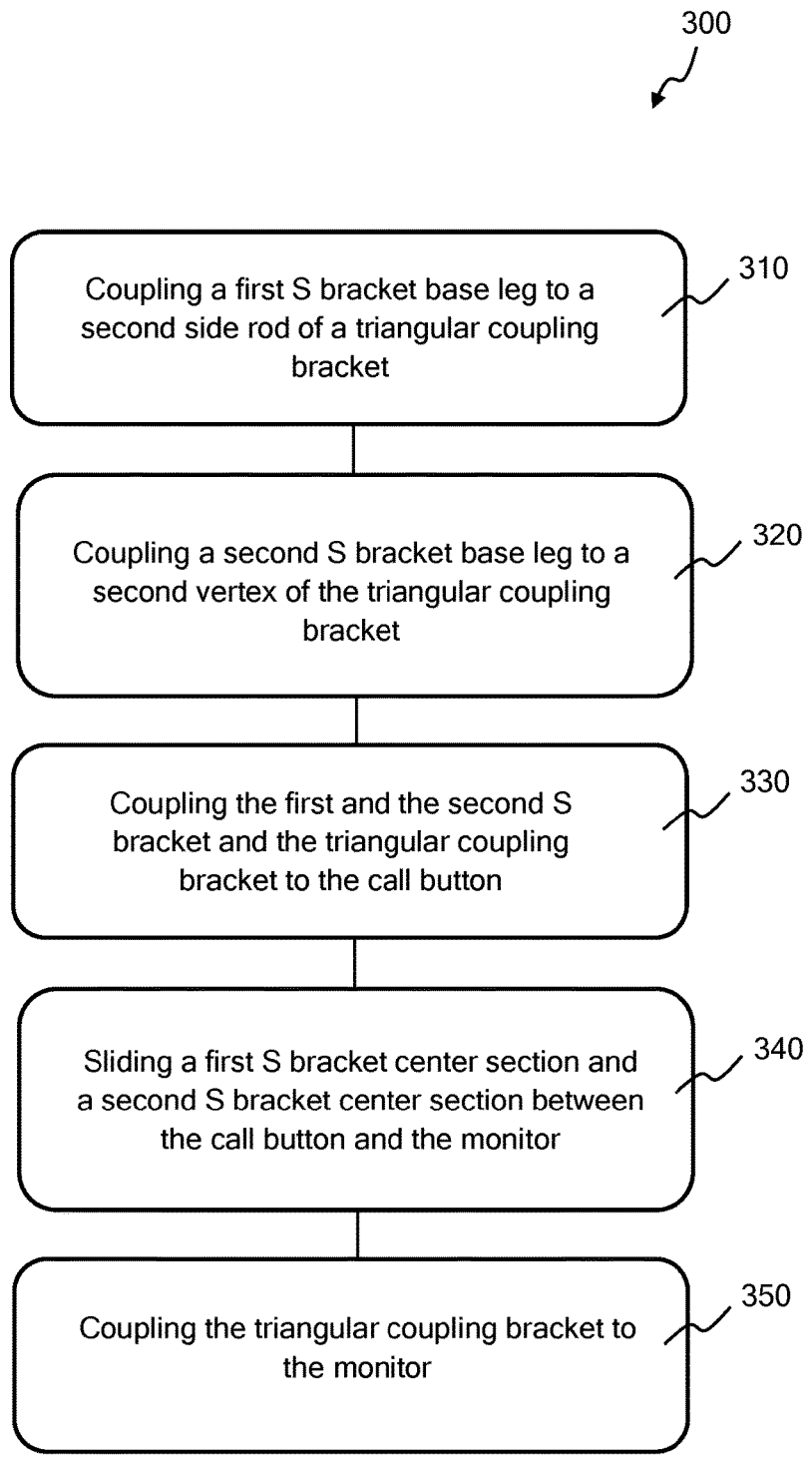
FIG. 15 illustrates a further method of mounting a call button to a monitor.

FIG. 15 illustrates a method 300 of mounting a call button to a monitor. Method 300 includes an act 310 of coupling a first S bracket base leg of a first S bracket to a second side rod of a triangular coupling bracket. Method 300 also includes an act 320 of coupling a second S bracket base leg of a second S bracket to a second vertex of the triangular coupling bracket. Method 300 also includes an act 330 of coupling the first and the second S bracket and the triangular coupling bracket to the call button. In some embodiments, act 330 of coupling the first and the second S bracket and the triangular coupling bracket to the call button includes coupling the first vertex to the call button through the first S bracket base leg. In some embodiments, act 330 of coupling the first and the second S bracket and the triangular coupling bracket to the call button includes coupling the second vertex to the call button through the second S bracket base leg.

Method 300 also includes an act 340 of sliding a first S bracket center section and a second S bracket center section between the call button and the monitor. And method 300 includes an act 350 of coupling the triangular coupling bracket to the monitor. In some embodiments, act 350 of coupling the triangular coupling bracket to the monitor includes coupling the third vertex to the monitor.

Method 300 can include many other acts. In some embodiments, method 300 includes coupling a first side rod, the second side rod, and a third side rod together at a first, the second, and a third vertex to form the triangular coupling bracket. In some embodiments, method 300 includes coupling three support rods to the triangular coupling bracket. In some embodiments, method 300 includes extending a first S bracket stabilizing leg and a second S bracket stabilizing leg along a front surface of the monitor.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. An apparatus for coupling a call button to a monitor at a self-checkout station, the apparatus comprising:
    a triangular coupling bracket, wherein the triangular coupling bracket comprises:
        a first side rod with a first side rod length, wherein the first side rod extends between a first vertex comprising a first hole and a second vertex comprising a second hole;

a second side rod with a second side rod length, wherein the second side rod extends between the first vertex and a third vertex comprising a third hole;

a third side rod, wherein the third side rod extends between the second vertex and the third vertex wherein the first and the second vertex are coupled to the call button, and the third vertex is coupled to the monitor;

a first support rod coupled to and extending between the first side rod and the second side rod;

a second support rod coupled to and extending between the first side rod and the third side rod; and a third support rod coupled to and extending between the second side rod and the third side rod: and an S bracket coupled to the triangular coupling bracket, wherein the S bracket comprises:

a base leg, wherein the base leg is an elongate member with a base leg first end and a base leg second end opposing the base leg first end;

a center section, wherein the center section is an elongate member with a center section first end coupled to the base leg second end, and a center section second end opposing the center section first end; and a stabilizing leg, wherein the stabilizing leg is an elongate member with a stabilizing leg first end coupled to the center section second end, and a stabilizing leg second end opposing the stabilizing leg first end.

2. The apparatus of claim 1, wherein the triangular coupling bracket further comprises at least one support rod extending between two of the three side rods.

3. The apparatus of claim 1, wherein the center section is perpendicular to the base leg, and the stabilizing leg is perpendicular to the center section.

4. The apparatus of claim 3, wherein the base leg first end is coupled to the second side rod.

5. A call button system for a self-checkout station in a retail store, the call button system comprising:

a monitor;

a call button comprising a call button housing;

a coupling bracket, wherein the coupling bracket couples the call button to the monitor, wherein the coupling bracket is triangular shaped, comprising three side rods coupled together at three vertices, wherein a first vertex of the coupling bracket is coupled to the call button housing with a first screw, and wherein the first screw extends through a first hole in the first vertex, through the first S bracket base leg, into a screw hole in the call button housing; and a first and a second S bracket coupled between the call button housing and the coupling bracket, wherein a first S bracket center section extends between the call button housing and the monitor, a second S bracket center section extends between the call button housing and the monitor, a first S bracket base leg is mounted between the coupling bracket and the call button housing, and a first S bracket stabilizing leg extends along a front surface of the monitor.

6. The call button system of claim 5, wherein a third vertex of the coupling bracket is coupled to the monitor.

7. A method of mounting a call button to a monitor, the method comprising:

coupling a first S bracket base leg of a first S bracket to a second side rod of a triangular coupling bracket;

coupling a second S bracket base leg of a second S bracket to a second vertex of the triangular coupling bracket;

coupling the first and the second S bracket and the triangular coupling bracket to the call button;

sliding a first S bracket center section and a second S bracket center section between the call button and the monitor; and coupling the triangular coupling bracket to the monitor.

8. The method of claim 7, further comprising coupling a first side rod, the second side rod, and a third side rod together at a first, the second, and a third vertex to form the triangular coupling bracket.

9. The method of claim 8, further comprising coupling three support rods to the triangular coupling bracket.

10. The method of claim 9, wherein the coupling the first and the second S bracket and the triangular coupling bracket to the call button comprises:

coupling the first vertex to the call button through the first S bracket base leg; and coupling the second vertex to the call button through the second S bracket base leg.

11. The method of claim 10, further comprising extending a first S bracket stabilizing leg and a second S bracket stabilizing leg along a front surface of the monitor.

12. The method of claim 11, wherein the coupling the triangular coupling bracket to the monitor comprises coupling the third vertex to the monitor.

* * * * *